United States Statutory Invention Registration [19]

[11] Reg. Number: H983

Brown et al. [43] Published: Nov. 5, 1991

[54] POLYKETONE FIBERS

[76] Inventors: Houston S. Brown, 7306 Tunbury La., Houston, Tex. 77095; Paul A. Westbrook, 15419 Rio Plz., Houston, Tex. 77083

[21] Appl. No.: 369,402

[22] Filed: Jun. 21, 1989

Related U.S. Application Data

[62] Division of Ser. No. 175,024, Mar. 30, 1988, abandoned.

[51] Int. Cl.[5] ..... B29C 47/88; B29C 47/30

[52] U.S. Cl. ..... 264/211.17; 264/211.22; 264/211.14; 264/176.1

[58] Field of Search ..... 528/392; 264/211.22, 264/211.17, 211.14, 176.1

[56] References Cited

U.S. PATENT DOCUMENTS

| | | | |
|---|---|---|---|
| 2,357,392 | 9/1944 | Francis, Jr. | 18/47.5 |
| 2,483,404 | 10/1949 | Francis, Jr. | 154/90 |
| 2,483,405 | 10/1949 | Francis, Jr. | 154/54 |
| 2,483,406 | 10/1949 | Francis, Jr. | 154/29 |
| 2,495,286 | 1/1950 | Brubaker | 260/63 |
| 3,595,245 | 7/1971 | Buntin et al. | 131/269 |
| 3,689,342 | 9/1972 | Vogt et al. | 156/167 |
| 3,694,412 | 9/1972 | Nozaki | 260/63 |
| 4,747,988 | 5/1988 | Deeg | 264/211.22 |
| 4,786,714 | 11/1988 | Drent | 528/392 |

FOREIGN PATENT DOCUMENTS

| | | |
|---|---|---|
| 0121965 | 10/1984 | European Pat. Off. . |
| 0181014 | 5/1986 | European Pat. Off. . |
| 1081304 | 8/1962 | United Kingdom . |

*Primary Examiner*—Robert L. Stoll
*Assistant Examiner*—Joseph D. Anthony

[57] ABSTRACT

A fiber prepared from a linear alternating polymer of carbon monoxide and at least one ethylenically unsaturated hydrocarbon, and a process for preparing this fiber.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYKETONE FIBERS

This is a division of application Ser. No. 175,024, filed Mar. 30, 1988, now abandoned.

RELATED APPLICATION

This application is related to application Ser. No. 245,605, entitled "Melt-Spinning Process," filed Sept. 19, 1988, Johan M. Beyer and Ebel Klei inventors.

BACKGROUND OF THE INVENTION

This invention is concerned with fibers prepared from a linear alternating polymer of carbon monoxide and an ethylenically unsaturated hydrocarbon.

The class of polymers of carbon monoxide and olefin(s) "polyketones", has been known for some time. Brubaker, U.S. Pat. No. 2,495,286, produced such polymers of relatively low carbon monoxide content in the presence of the free radical initiators, e.g., peroxy compounds. U.K. 1,081,304 produced similar materials of higher carbon monoxide content in the presence of alkylphosphine complexes of palladium salts as catalyst. Nozaki extending this process to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbons, e.g. ethylene or ethylene and propylene has become of greater interest in part because of the improved availability of the polymers. These polymer, often referred to polyketones or polyketone polymers have been shown to be of the repeating formula —CO—(A)—wherein A is the moiety of an ethylenically unsaturated hydrocarbon polymerized through the ethylenic unsaturation. For example, when the ethylenically unsaturated hydrocarbon is ethylene the polymer will be represented by the repeating formula $—CO—(CH_2—CH_2)—$. The general process for the more recent publication of such polymers is illustrated by a number of published European Patent Applications including 121,965 and 181,014. These process typically involve a catalyst composition formed from a compound of a Group VIII metal, selected from palladium, cobalt or nickel, the anion of a strong non-hydrohalogenic acid and a bidentate ligand of phosphorous, arsenic or antimony.

Even though there have been disclosed numerous processes for preparing polyketones, the polyketones have generally not been blended with other substances to form blends usable as fibers

SUMMARY OF THE INVENTION

The present invention claims a fiber prepared from a blend of a linear alternating polymer of carbon monoxide and at least one ethylenically unsaturated hydrocarbon.

Further, the present invention is a process for preparing a fiber from a linear alternating polymers of carbon monoxide and at least one ethylenically unsaturated hydrocarbon, wherein said process comprises the following steps:

(i) adding a linear alternating polymer of carbon monoxide and at least one ethylenically unsaturated hydrocarbon a high shear blending apparatus;

(ii) mixing the contents at temperature between about 175° C. and 300° C. therein;

(iii) extruding the contents into a fiber; and (iv) quenching the resulting strand.

DETAILED DESCRIPTION OF THE INVENTION

The polyketone polymers of the invention are linear alternating polymers of carbon monoxide and at least one ethylenically unsaturated hydrocarbon. Suitable ethylenically unsaturated hydrocarbons which are useful as precursors of the polyketone polymers have up to 20 carbon atoms inclusive, preferably up to 10 carbon atoms inclusive, and are aliphatic such as ethylene and other α-olefins including propylene, butylene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketone polymers are copolymers of carbon monoxide and ethylene or terpolymers of carbon monoxide, ethylene and a second hydrocarbon of at least 3 carbon atoms, particularly an α-olefin such as propylene.

The structure of the polyketone polymer is that of a linear alternating polymer of carbon monoxide and at least one ethylenically unsaturated hydrocarbon and the polymer will contain substantially one moiety of carbon monoxide for each moiety of unsaturated hydrocarbon. When terpolymers of carbon monoxide, ethylene and a second hydrocarbon are employed in the blends of the invention there will be within the terpolymer at least two units incorporating a moiety of ethylene for each unit incorporating a moiety of the second hydrocarbon, preferably from about 10 units to about 100 units incorporating a moiety of ethylene for each unit incorporating a moiety of the second hydrocarbon. The polymer chain is therefore represented by the formula $$—[CO—CO—CH_2—CH_2)]_x—[CO—(B)—]—$$

where B is the moiety obtained by polymerization of the second hydrocarbon through the ethylenic unsaturation. The $—[—CO—(CH_2—CH_2—)—]—$and $[—CO—(B)—]_y$ are found randomly throughout the polymer chain and the ratio of y:x is no more than about 0.5. In the modification of the invention where copolymers of carbon monoxide and ethylene are employed there will be no second hydrocarbon present in the polymer chain and the polymer is represented by the above formula wherein y =0. If y is other than 0, i.e., terpolymers are employed, ratios of y:x of no more than about 0.2 are preferred. The end groups or "caps" of the polymer chain will depend on what materials were present during the preparation of the polyketone polymer and whether and how the polymer was purified. The precise properties of the polymer will not depend to any considerable extent upon the particular end groups so that the polymer is fairly represented by the above formula for the polymer chain.

Of particular interest are those polyketones of molecular weight from about 3,000 to about 500,000, especially those of molecular weight from about 10,000 to about 50,000.

The physical properties of the polyketone polymers will depend in part on the molecular weight of the polymer, whether the polymer is a copolymer or a terpolymer and the relative proportion of the second hydrocarbon present in the case of terpolymers.

Typically melting points for such polymers are from about 175° C. to about 300° C., more typically from about 180° C. to about 280° C.

A method of producing the polyketone polymers which is now becoming conventional is to contact the carbon monoxide and ethylenically unsaturated hydrocarbon(s) with a catalyst composition formed from a palladium compound, the anion of a non-hydrohalogenic acid having a pKa below about 6 and a bidentate phosphorous ligand. The scope of the process of polyketone production is extensive but, without wishing to be limited, a preferred palladium compound is a palladium carboxylate, particularly palladium acetate, the preferred anion is the anion of trifluoroacetic acid or p-toluenesulfonic acid, and the preferred bidentate phosphorous ligand is 1,3-bis(diphenylphosphino)propane or 1,3-bis[di(2-methoxyphenyl)phosphino]propane. Such a process for polyketone production is illustrated by copending U.S. application Ser. No. 930,468, filed Nov. 14, 1986.

Polymerization is conducted in a gaseous phase or in a ligand phase in the presence of an reaction diluent such as an alkanol, e.g., methanol or ethanol. The reactants and catalyst are contacted under polymerization conditions in the presence of the catalyst composition by conventional methods such as shaking or stirring in a suitable reaction vessel. Suitable reaction temperatures are from about 20° C. to about150° C., preferably from about 50° C. to about 135° C. Typical reaction pressures are from about 1 bar to about 200 bar, more typically from about 10 bar to about 100 bar. Subsequent to reaction, the polymer product is recovered as by decantation or filtration. The polymer product may contain residues of the catalyst composition which are removed, if desired, by treatment with a solvent or a complexing agent which is selective for the residues. Useful polyketones for the novel fibers have limiting viscosity members (LVN) as measured by the method wherein the polymer is dissolved in metacresol at 60° C.; using a standard capillary viscosity measuring device, such as a Cannon-Ubbelohde viscometer in the range of 0.5 to 10 LVN and more preferably 0.8 to 4 LVN and most preferably 0.8 to 2.5 LVN.

The fibers prepared from these blends exhibit mechanical integrity.

In an alternate modification the polyketone polymer can be blended in a mixing device which exhibits high shear with conventional additives such as antioxidants, stabilizers, internal/external lubricants, mold release agents, colorants, fire resistant materials and other substances which are added to enhance the fiber. Such additives are added to the polyketone polymer by conventional methods.

For fibers prepared from the unique polymer it is expected that the typical dtex be in the range of 1–3000, through 2–50 is preferred. Regarding specific gravity of the unique, it is usable to have fibers of at least about 1.0 specific gravity. Moisture regain of the novel fibers is in the range of 0.1–3% (at 20° C. and 65% RH). Shrinkage characteristics of the novel polymers can be between 3–30% at 165° C.

Elongation to break values depend on the end use for the novel fibers, but for some end uses the novel fibers can demonstrate 15–20% elongation or 80–100% elongation. Fiber tenacity also depends on the end use desired, but 4.5–7.5 cN/dtex is preferred for some end uses and obtainable with these fibers. Tenacity of from 8 cN/dtex –14 cN/dtex is obtainable with these fibers and can be advantageous in some cases.

Illustrative Embodiment I

A linear alternating terpolymer 087/012 of carbon monoxide, ethylene and propylene was produced by contacting the monomers in the presence of a catalyst composition formed from palladium acetates, the anion of trifluoroacetic acid and 1,3-bis[di(2-methoxyphenyl)-phosphino]-propane). 200 ppm Ionol, 700 ppm Irganox 245 available from Ciba Geigy, and 0.1% by weight zinc oxide were added to the polymer to enhance stability. The melting point of the terpolymer was 218° C. and the polymer had a limiting viscosity number (LVN) of 1.16, measured at 60° C. in m-cresol.

Illustrative Embodiment II

The polyketone polymer of Illustrative Embodiment I were spun on a fiber line having a flat 220° C. temperature profile across all heating zones. The fiber line involved a one inch, (d) diameter and a length of 24 inches (L), 24 L/d extruder made by modern Plastics Machinery with temperature monitored in three locations along the extruder. The pressure was monitored in two locations in the latter part of the barrel. The extruder fed a 2.92 cc Kawasaki melt pump, with the input pressure feedback controlled by extruder rpm. Alternative pumps could be used herein such as 1.75 cc Zenith pump. Pressure was monitored in the adapter (also temperature controlled) between the extruder and the melt pump, both before and after a screen pack. The pressure used for feedback control of the melt pump was that after the screen pack, since the pressure-before the extruder screen pack was found to cyclically vary as a function of the final screw speed. Output pressure between the melt pump and the final screen pack was also monitored. The spinnerette setup was 60 holes, L/d =4, with a hole diameter (d) of 15 mil and a hole length (L) of 60 mils (Spinnerettes were made by Nippon Nozzle). The fibers were quenched with air which was controlled to within one half degree C, with the quench temperature between 50° and 95° F. The quench zone was six feet in length, and divided into three sections, each of which accepted about 10 to 80 percent of the total quench air flow. Quenching can be performed with hot air or cool air. If hot air is used, quenching would be performed at temperatures from about 95° F. to about 400° F.; (35° C. -210° C.). For the quenching process, the hot or cool air can be blown past the fibers, i.e. forced air. Alternatively, a quiescent quench, with non-moving air can be performed.

Melt blown fiber fabrication is considered as a usable fabrication method for the novel polymers. Such as by the processes of U.S. Pat. Nos. 2,357,392; 2,483,404; 2,483,405; 2,483,406; 2,810,426; 3,595,245; and 3,689,342. Other methods of fiber fabrication are considered usable within the scope of the invention.

The fiber bundle can be slipped through a metered spin finish applicator. The fiber bundle can then be passed through an aspirator, and through a cutter. At this point, the fiber bundle can either go directly to the winder for a "godet-less" type process (for example, by aspiration), or pass over a godet pair, 0.75 meter (M) in circumference, which are capable of speeds for example, from 600 to 6000 M/m, or pass to three godet pairs, which can be identified as feed, draw and relax. These rolls can be 0.5657 M in circumference, and capable of speeds from 80 to 3000 meters/minute (M/m), 120 to 6000 M/m, and 600 to 6000 M/m, respectively. All three of these rolls should be capable of being heated, with a range from ambient to about 250° C. One of the two cold rolls can be reversed in directions such that the cold rolls can be used in-line as a fourth godet pair.

After fabrication the fiber can be wound with a Leesona precision winder, with a speed range of approximately 50 to 1800 M/m, or a Barmag high speed winder, with a speed range of 300 to 6000 M/m. A Toray fray detector can be placed at virtually any position along the spin line to detect broken fibers.

Fibers tenacities and percent elongation measured on either an Instron (single fibers) or a Textechno Statimat M (fiber bundles) under ASTM conditions D2256-80. Optical properties can be examined with a Nikon Labophot-pol microscope. Melt flows can be determined using a Tinius-Olson melt plastometer, using the timed piston travel method, ASTM D-1238-82.

Melt spinning and post drawing conditions for the 087/012 polymer fibers are summarized in Table 1.

TABLE 1

Melt Spinning Conditions For Fibers of Illustrative Embodiment I

| ROLL # | FEED M/m(C) | DRAW M/m(C) | RELAX M/m(C) | WINDER M/m(<) | DPF[1] (~) |
|---|---|---|---|---|---|
| 18390-26-1 | 300(20) | 500(50) | 520(20) | 520(1.5) | 14.4 |
| 18390-26-2 | 325(20) | 500(70) | 600(50) | 605(1.5) | 12 |
| 18390-26-3 | 325(20) | 600(70) | 575(50) | 580(1.5) | 12 |
| 18390-26-4 | 325(40) | 600(70) | 575(50) | 580(1.5) | 12 |
| 18390-26-5 | 325(50) | 700(80) | 650(50) | 690(1.5) | 11.6 |
| 18390-26-6 | 325(50) | 700(90) | 680(50) | 690(1.5) | 11.6 |
| 18390-26-7 | 325(50) | 900(90) | 875(50) | 890(1.5) | 9 |
| 18390-26-8 | 325(50) | 1200(100) | 1175(60) | 1195(1.5) | 6 |

[1]Denier per filament

Generally, higher numbered rolls have higher draw ratios; however some differences in draw temperatures also exist. All fibers were post drawn below the crystallization temperature. Draw ratios range from 1.7 to 3.7 and denier per filament (DPF) was calculated from the draw ratios.

Mechanical properties of 087/012 polymer fibers are summarized in Table 2. As expected, modulus and tenacity generally increase with draw ratio while strain to break decreases.

TABLE 2

Mechanical Properties of Fibers of Illustrative Embodiment I

| ROLL # | Modulus[1] (g/den) | Tenacity[2] (g/den) | Elongation[3] (%) |
|---|---|---|---|
| 18390-26-1 | — | — | — |
| 18390-26-2 | 22 | 1.0 | 75 |
| 18390-26-3 | — | — | — |
| 18390-26-4 | 26 | 0.9 | 55 |
| 18390-26-5 | 36 | 1.3 | 60 |
| 18390-26-6 | 34 | 1.2 | 50 |
| 18390-26-7 | 47 | 1.5 | 45 |
| 18390-26-8 | 77 | 4.5 | 35 |

[1]Modulus was determined by ASTM D2256-80.
[2]ASTM condition D2256-80.
[3]ASTM condition D2256-80.

Properties of melt spun CARILON EP polymer fibers indicate that polyolefin type performance can be obtained at low draw ratios.

The fastest spinning conditions obtained to date for these fibers are 1200 meters per minute with a 3.7 draw ratio, which yields 6 denier per filament fiber. Mechanical properties of these fibers are 77 grams/denier modulus and 4.5 grams/denier tenacity at 35 percent elongation.

As many widely different embodiments of this invention may be made without departing from the spirit and scope therefor, it is to be understood that this invention is not limited to the specific embodiments thereof except as defined in the claims.

What is claimed:

1. A process for preparing a fiber from a linear alternating polymers of carbon monoxide and at least one ethylenically unsaturated hydrocarbon wherein said process comprises the following steps:
   (i) adding a linear alternating polymer of carbon monoxide and at least one ethylenically unsaturated hydrocarbon to a high shear mixing device;
   (ii) mixing the contents at temperatures between about 175° C. and 300° C.;
   (iii) extruding the contents into a fiber; and
   (iv) quenching the extruded strand.

2. The process of claim 1, wherein said linear alternating polymer is of the formula $$\left[\overset{O}{\overset{\|}{C}}-(C_2H_4)\right]_x\left[\overset{O}{\overset{\|}{C}}-(B)\right]_y$$

wherein B is the moiety of an ethylenically unsaturated α-olefin of at least 3 carbon atoms polymerized through the ethylenic unsaturation, the ratio of y:x is no more than about 0.5.

3. The process of claim 1, wherein said linear alternating polymer is of the formula $$\left[\overset{O}{\overset{\|}{C}}-(C_2H_4)\right]_x\left[\overset{O}{\overset{\|}{C}}-(B)\right]_y$$

wherein B is the moiety of an ethylenically unsaturated α-olefin of at least 3 carbon atoms polymerized through the ethylenic unsaturation, wherein group B of said linear alternating polymer is propylene and the ratio of y:x is no more than about 0.2.

4. The process of claim 2, wherein said linear alternating polymer comprises a second ethylenically unsaturated hydrocarbon.

5. The process of claim 2, wherein y =0.

6. The process of claim 1, wherein the mixing is performed at temperatures between about 190° C. and about 285° C.

7. The process of claim 1, wherein the fiber is extruded forming a multifilament strand.

8. The process of claim 1, wherein the extruded strand is quenched in hot air.

* * * * *